United States Patent
Fafet et al.

(10) Patent No.: US 8,690,688 B2
(45) Date of Patent: Apr. 8, 2014

(54) DOUBLE DAMPING FLYWHEEL WITH DOUBLE DAMPING ELEMENTS

(75) Inventors: Olivier Fafet, Amiens (FR); Daniel Fenioux, Saleux (FR); Michel Graton, Paris (FR); Lionel Renier, Canaples (FR)

(73) Assignee: Valeo Embratages, Amiens (FR)

( * ) Notice: Subject to any disclaimer, the term of this patent is extended or adjusted under 35 U.S.C. 154(b) by 0 days.

(21) Appl. No.: 13/143,124

(22) PCT Filed: Dec. 9, 2009

(86) PCT No.: PCT/FR2009/052463
§ 371 (c)(1),
(2), (4) Date: Sep. 26, 2011

(87) PCT Pub. No.: WO2010/079273
PCT Pub. Date: Jul. 15, 2010

(65) Prior Publication Data
US 2012/0048057 A1 Mar. 1, 2012

(30) Foreign Application Priority Data
Jan. 8, 2009 (FR) ...................................... 09 50077

(51) Int. Cl.
*F16F 15/121* (2006.01)
(52) U.S. Cl.
USPC ....................................................... 464/68.8
(58) Field of Classification Search
USPC ................. 464/46, 64.1, 67.1, 68.7, 68.8; 192/213.1–213.22
See application file for complete search history.

(56) References Cited

U.S. PATENT DOCUMENTS

| 4,347,717 | A | | 9/1982 | Lamarche | |
|---|---|---|---|---|---|
| 4,559,024 | A | * | 12/1985 | Tamura et al. | 464/68.8 X |
| 6,048,284 | A | * | 4/2000 | Gerhardt et al. | 464/68.8 X |
| RE38,258 | E | * | 9/2003 | Reik et al. | 192/213.22 X |

FOREIGN PATENT DOCUMENTS

| FR | 2647171 | 11/1990 |
|---|---|---|
| FR | 2776733 | 10/1999 |
| JP | 63101537 | 5/1988 |

* cited by examiner

*Primary Examiner* — Gregory Binda
(74) *Attorney, Agent, or Firm* — Berenato & White, LLC

(57) ABSTRACT

A double damping flywheel comprises primary and secondary coaxial members. The members are rotatable relative to one another and coupled by first and second damping elements arranged in series by a connecting web. The first damping element includes at least one curved elastic member running circumferentially between two first seatings. The second damping element includes at least two groups of elastic members, each including at least two straight elastic members arranged in series by an intermediate bearing element. Each of the groups of straight elastic members runs circumferentially between two second seatings. An annular member for phasing the straight elastic members, separate from the connecting web, carries the intermediate bearing element of each group. The difference between the maximum angular displacement between the primary member and the connecting web, and the maximum angular displacement between the secondary member and the connecting web, is less than 30°.

16 Claims, 4 Drawing Sheets

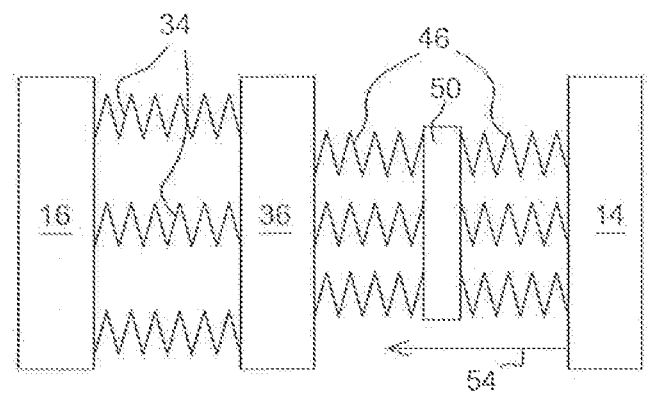
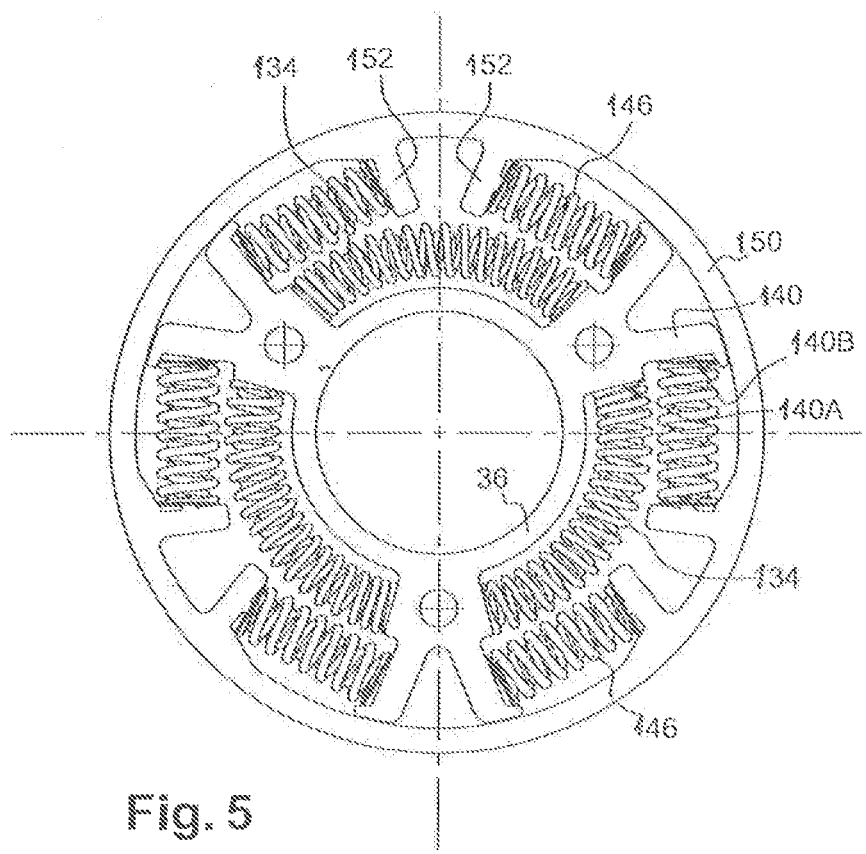
Fig. 5

DOUBLE DAMPING FLYWHEEL WITH DOUBLE DAMPING ELEMENTS

CROSS-REFERENCE TO RELATED APPLICATIONS AND CLAIM TO PRIORITY

This application relates to International Application No. PCT/FR2009/052463 filed Dec. 9, 2009 and French patent application Ser. No. 09/50077 filed Jan. 8, 2009, of which the disclosures are incorporated herein by reference and to which priority is claimed.

FIELD OF THE INVENTION

This invention relates to a coupling device of a motor vehicle engine with a gear box, with a double damping flywheel. In particular, but not exclusively, the invention relates to a coupling device designed to equip a motor vehicle with a diesel engine.

BACKGROUND OF THE INVENTION

Normally, a coupling device comprises an engine flywheel coupled to a crankshaft of an engine of the motor vehicle. In the case of a device with a double damping flywheel, the engine flywheel comprises primary and secondary engine flywheel members, coupled to each other by damping means. A double damping flywheel is designed to filter the noise and vibrations from the engine.

There is already known in the state of the art, notably according to FR-A-2647171, a double damping flywheel for a clutch, notably of a motor vehicle, comprising primary and secondary engine flywheel members, generally revolving around an axis and essentially coaxial, mobile in rotation in relation to one another and coupled by means of first and second damping means arranged in series by a connecting web generally revolving around the axis of the primary and secondary members.

The first damping means comprise four curved elastic members distributed circumferentially around the axis of the primary and secondary members. It will be recalled that a curved elastic member is an elastic member designed to deform circumferentially. Each curved elastic member runs circumferentially between seatings carried by the connecting web.

The second damping means comprise eight straight elastic members distributed circumferentially around the axis of the primary and secondary members. It will be recalled that a straight elastic member is an elastic member designed to deform axially. Each straight elastic member runs in a window of the connecting web.

These first and second damping means in series make it possible to filter noise and vibrations at different engine running speeds.

For example, when starting the motor vehicle, the angular displacement allowed by the second damping means with straight elastic members is normally insufficient. Thus, at low engine running speed, notably on start-up, the noise and vibrations from the engine are mainly filtered by means of the first damping means with curved elastic members.

Furthermore, when the engine is running at high speed, the curved elastic members of the first damping means are subjected to a centrifugal force, which has the effect of generating friction between these curved elastic members and the guide members in which they are housed. In this case, this friction limits the effectiveness of these first damping means.

Thus, when running at high speed, the noise and vibrations from the engine are mainly filtered by means of the second damping means, the straight springs of which are not subject to the aforesaid friction.

Nevertheless, in certain cases, notably when running at high speed, the angular stiffness of the second damping means is too high to ensure satisfactory filtering of the vibrations.

SUMMARY OF THE INVENTION

The invention is intended notably to remedy this disadvantage by providing a double damping flywheel with vibration filtering which is effective in all situations of normal operation.

To this end, the invention relates to a double damping flywheel for a clutch, notably of a motor vehicle, comprising primary and secondary engine flywheel members, essentially coaxial, mobile in rotation in relation to one another and coupled by means of first and second damping means arranged in series by a connecting web, such that:
  the first damping means comprise at least one curved elastic member running circumferentially between two first seatings carried by the connecting web,
  the second damping means comprise at least two groups of elastic members, each comprising at least two straight elastic members arranged in series by an intermediate bearing element, each group of straight elastic members running circumferentially between two second seatings carried by the connecting web,
  at least one annular member for phasing the straight elastic members, separate from the connecting web, carrying the intermediate bearing element of each group,
  characterised in that the difference between the maximum angular displacement between the primary member and the connecting web, and the maximum angular displacement between the secondary member and the connecting web, is less than 30', preferably less than 10°.

This means that the aforesaid two displacements are similar to each other. The maximum angular displacement between the primary member and the connecting web can be greater or smaller than the maximum angular displacement between the secondary member and the connecting web.

Unlike straight elastic members of the state of the art, arranged parallel to one another, the groups of straight elastic members arranged in series allow a large angular displacement of the second damping means, without entailing the disadvantages of damping means with curved elastic members. Notably, the second damping means are not subject to bothersome friction due to the centrifugal force at high running speeds.

Because of the large angular displacement allowed, the elastic forces generated by these second damping means are less than those generated by the damping means with straight springs of the state of the art.

Furthermore, thanks to the annular phasing member, carrying the intermediate elements against which the straight elastic members are supported, each group of elastic members is deformed in phase. Thus, the elastic forces generated by the groups of elastic members are therefore distributed circumferentially and uniformly around the axis, so that the radial component of these forces is essentially zero.

Due to this essentially zero radial component, the friction of the straight elastic members on their seatings is limited, which optimises the effectiveness of these straight elastic members.

Such second damping means therefore permit effective filtering of vibrations, even at high engine running speeds, when the effectiveness of the curved elastic members of the first damping means is limited because of the centrifugal force.

Moreover, the control of the aforesaid angular displacements has the effect of increasing the performance of the second damping means by improving the filtering of noise and vibrations from the engine in all modes of operation.

A double damping flywheel according to the invention may moreover comprise one or more of the following characteristics.

The first and second damping means have essentially equal static stiffnesses, in other words their relative difference is less than approximately 30%.

The second damping means comprise three groups of elastic members, each group comprising two straight elastic members each running between a second respective seating and the intermediate bearing element of this group.

The phasing member is a washer, generally revolving around the axis of the primary and secondary members, each intermediate bearing element being formed by a radially external lug arranged on this washer.

Each curved elastic member of the first damping means is arranged radially on the outside with respect to each straight elastic member of the second damping means. In fact, the annular phasing member is preferably arranged radially on the inside of the double damping flywheel in order to limit its inertia.

The double damping flywheel comprises external sealing means comprising first and second sealing washers, the first sealing washer being arranged between the second guide washer of the first damping means and the fourth guide washer of the second damping means, and the second sealing washer being arranged between the first guide washer of the first damping means and the third guide washer of the second damping means.

The double damping flywheel comprises internal sealing means comprising third and fourth sealing washers, the third sealing washer being arranged between the fourth guide washer and the phasing member of the second damping means, and the fourth sealing washer being arranged between the third guide washer of the second damping means and the web.

The double damping flywheel comprises means for limiting the torques to which the first and second damping means are subjected, comprising a seating washer attached so as to rotate with the limiting hub, and a spring washer of the Belleville type inserted between the seating washer and the secondary flywheel, designed to apply a load on the secondary flywheel.

Wear-resistant washers are inserted between the spring washer and the secondary flywheel, and between the secondary flywheel and the guide washer.

The connecting web comprises at least one radial lug carrying both at least one of the first seatings, designed to cooperate with the curved elastic member of the first damping means, and at least one of the second seatings, designed to cooperate with one of the straight elastic members of the second damping means.

The phasing member is made of a material with a density of less than 5000 kg/m3, preferably chosen from among aluminium, titanium or a composite with a fibreglass, carbon or kevlar base. The inertia of this phasing member is thereby limited.

The second damping means comprise two guide washers each comprising at least one axial indentation forming a housing for a group of straight elastic members.

BRIEF DESCRIPTION OF THE DRAWINGS

The invention will be better understood on reading the description below, provided purely by way of example and making reference to the attached drawings in which:

FIG. 4 is a diagram illustrating the principle of operation of the double damping flywheel;

FIG. 5 is a front view of part of a double damping flywheel according to an alternative embodiment of the invention.

DETAILED DESCRIPTION

Figure 1:
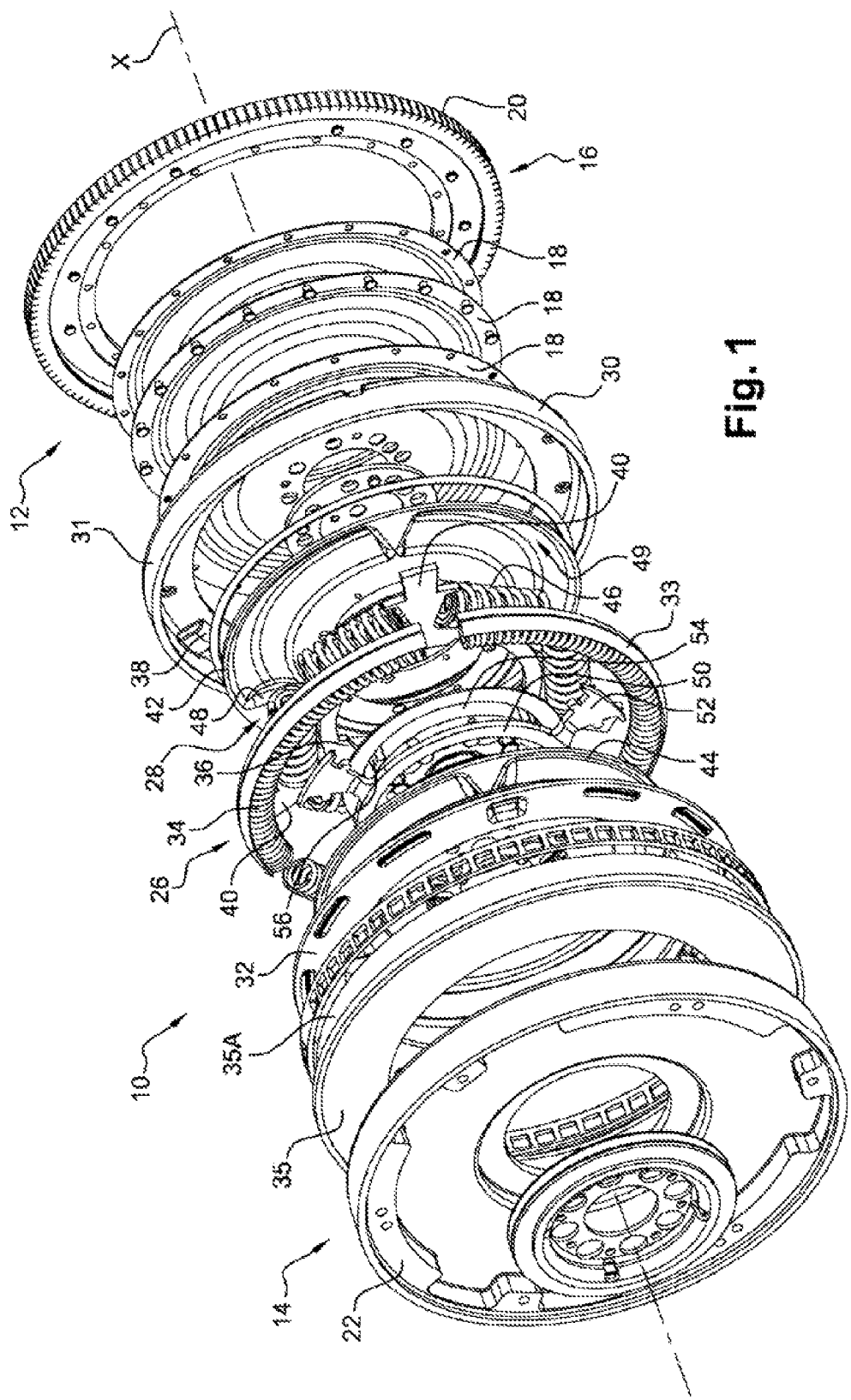
FIG. 1 is a exploded perspective view of a double damping flywheel according to an exemplary embodiment of the invention.
Figure 2:
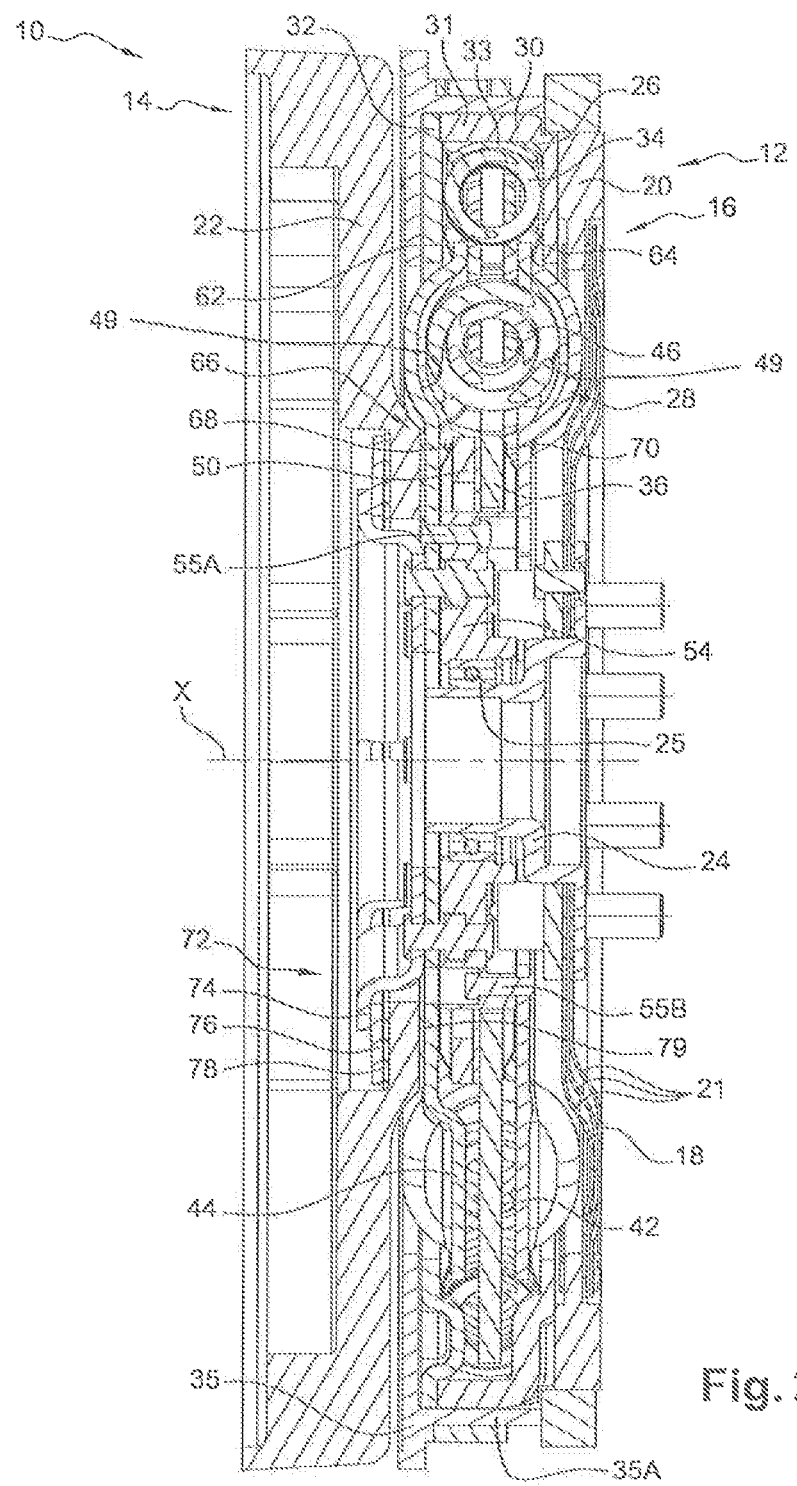
FIG. 2 is a partial axial sectional view of the double damping flywheel of FIG. 1.
Figure 3:
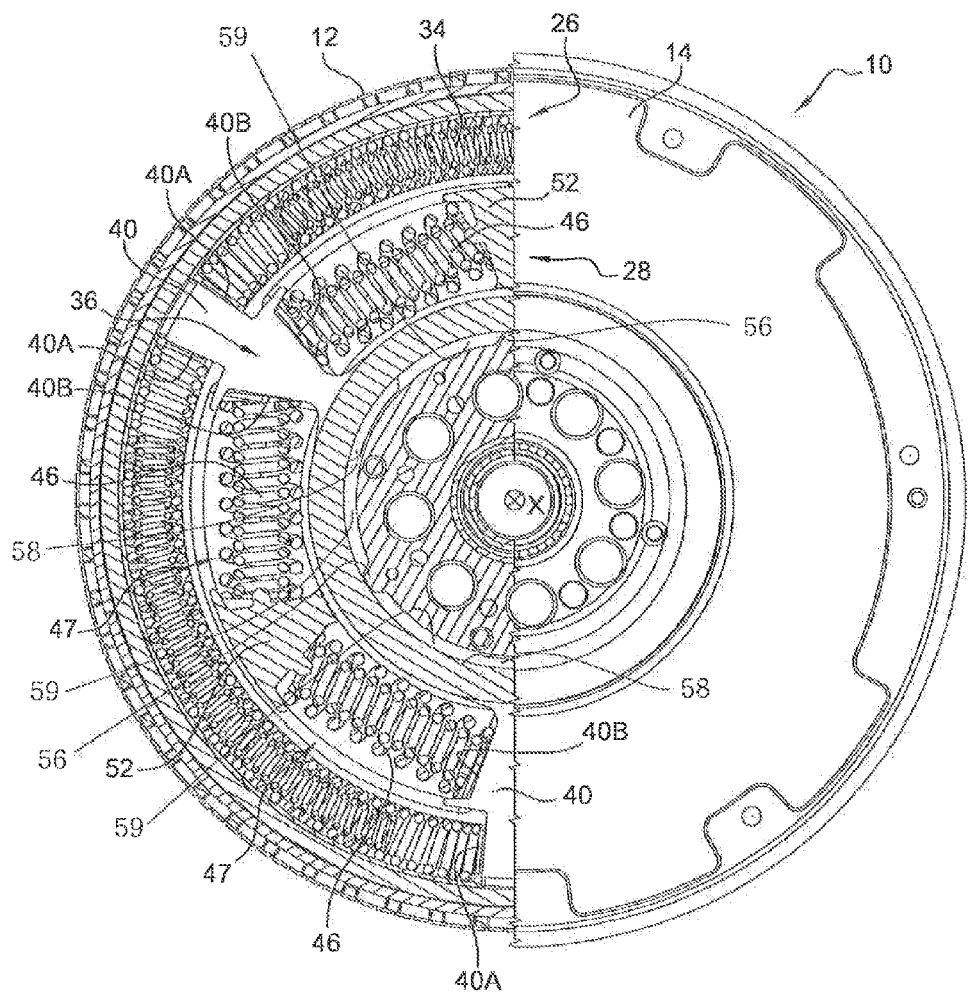
FIG. 3 is a front view of the double damping flywheel of FIG. 1.

FIGS. 1 to 3 show a double damping flywheel 10 according to an exemplary embodiment of the invention, designed to equip a motor vehicle clutch. Conventionally, such a clutch is designed to couple an engine, for example a diesel type engine, with a gear box of the motor vehicle.

The double damping flywheel 10 is designed to be attached so as to rotate with a crankshaft of the engine, with the aid of conventional attachment means, for example with screws.

The double damping flywheel 10 comprises a primary member 12 and a secondary member 14 of the engine flywheel, generally revolving and essentially coaxial, with a common axis X.

The primary member 12 comprises a flexible primary flywheel 16, comprising at least two, preferably three, stacked plate disks 18, and a first inertia member 20, preferably made of cast iron or steel, generally revolving, surrounding the plate disks 18. Preferably, in order to limit their axial dimensions, the plate disks 18 are bent axially so as to form bends 21. These bends 21 are offset axially and radially with respect to one another, so as not to impede the flexibility of the primary flywheel.

The primary flywheel 16 is designed to carry the means of attachment with the crankshaft.

The secondary member 14 comprises a secondary flywheel 22, preferably made of cast iron, designed to carry a reaction plate of a mechanism of the clutch. Conventionally, this reaction plate is designed to form a friction disk support, connected in rotation with a shaft of the gear box and stressed by a pressure plate attached so as to rotate with the secondary flywheel 22, when the clutch is in the engaged position.

The secondary member 14 is mounted rotating on a hub 24 of the primary member 12, secured onto the flexible flywheel 16. To this end, a centring ball bearing 25 is arranged between the hub 24 and the secondary member 14. Alternatively, this ball bearing 25 could be replaced by two ball bearings or by a centring bearing.

The primary 12 and secondary 14 members of the engine flywheel are coupled by means of first 26 and second 28 damping means with circumferential effect, coupled in series, designed to reduce vibrations from the motor vehicle engine.

The first damping means 26 comprise first 30 and second 32 guide washers, attached so as to rotate with the primary member 12 with the aid of conventional attachment means, for example with the aid of rivets.

The first damping means 26 also comprise curved elastic members 34, preferably three curved elastic members 34 distributed circumferentially around the axis X. These curved elastic members 34 are designed to elastically couple the first 30 and second 32 guide washers with a connecting web 36 generally revolving around the axis X.

To this end, the first 30 and second 32 guide washers comprise projections 38 forming seatings for the curved elastic members 34, and the connecting web 36 comprises lugs 40, preferably three lugs 40, each carrying first seatings 40A. Thus, each curved elastic member 34 runs circumferentially between two first seatings 40A, carried respectively by two circumferentially consecutive lugs 40 of the connecting web 36.

It will be noted that the first guide washer 30 comprises, at its radially external periphery, a flange 31 running axially as far as the second guide washer 32, so as to form, with this second guide washer 32, a housing for the curved elastic members 34. This flange 31 is capable of retaining a viscous lubricant, such as grease or oil, around curved elastic members 34, in particular preventing this lubricant from escaping under the effect of a centrifugal force. Furthermore, this flange 31 is also capable of retaining the curved elastic members 34 when they are subjected to the centrifugal force, running at high engine speeds.

Guide members 33, in the form of spouts, in which the curved elastic members 34 slide, are inserted between the flange 31 and each of these elastic members 34.

The double damping flywheel 10 also comprises a second annular inertia member 35 comprising, at its radially external periphery, an inertia flange 35A running axially so as to surround the first 30 and second 32 guide washers. This second annular inertia member 35, associated with the first inertia member 20, is designed to optimise the inertia of the primary flywheel 16.

The second damping means 28 comprise third 42 and fourth 44 guide washers, attached so as to rotate with the secondary member 14 with the aid of conventional attachment means, for example with the aid of screws or rivets. The second damping means 28 also comprise straight elastic members 46, preferably three groups 47 each comprising two straight elastic members 46. These three groups 47 are distributed circumferentially around the axis X.

Each group 47 of two straight elastic members 46 in series runs circumferentially between two second seatings 40B, carried respectively by two circumferentially consecutive lugs 40 of the connecting web 36.

Thus, each lug 40 carries both a first seating 40A for a curved elastic member 34 of the first damping means 26 and a second seating 403 for a straight elastic member 46 of the second damping means 28. In other words, the curved elastic members 34 and the straight elastic members 46 are essentially in the same radial alignment.

The straight elastic members 46 are designed to elastically couple the connecting web 36 with the third 42 and fourth 44 guide washers. To this end, the third 42 and fourth 44 guide washers comprise bearing surfaces 48 forming seatings for the straight elastic members 46.

Each guide washer 42, 44 comprises axial indentations 49, the edges of which form the bearing surfaces 48, each indentation 49 being designed to house a group of two straight elastic members 46. These indentations 49 are preferably filled with viscous lubricant, such as grease or oil, in order to limit the friction of the straight elastic members 46.

It will be noted that the inertia of the connecting web 36, the seatings of which are carried by the lugs 40, is less than the inertia of a conventional connecting web the seatings of which are formed by edges of windows housing elastic members. In fact, such windows comprise a radially external edge which forms a mass increasing the inertia of the web.

In order for the straight elastic members 46 of each group to be arranged in series without friction, the second damping means 28 comprise an annular member 50 for phasing the straight elastic members 46, separate from the connecting web 36.

The annular phasing member 50 is formed by a washer comprising radially external lugs 52, each lug 52 forming an intermediate bearing element designed to be inserted between the two consecutive straight elastic members 46 of a same group of elastic members, so that these two consecutive straight elastic members 46 are arranged in series.

Since the intermediate support elements 52 are carried by the same annular phasing member 50, the groups 47 of straight elastic members 46 are deformed in phase with respect to one another. The elastic forces generated by the second damping means 28 are therefore distributed circumferentially and uniformly.

Preferably, the phasing member 50 is shaped so as to have low inertia, in order to limit the resonance phenomena amplifying the vibrations.

In fact, the radially external mass of the phasing member is limited, since the intermediate support elements 52 are formed by lugs, and not by edges of windows housing elastic members. Furthermore, the phasing member 50 is preferably made of a material with a density of less than 5000 kg/m3, preferably chosen from among aluminium, titanium or a composite with a fibreglass, carbon or kevlar base, optionally comprising strengthening inserts. Optionally, the phasing member 50 could comprise reinforcement inserts, notably in the event of its density being reduced.

Moreover, the dimensions of the phasing member 50 are preferably limited in order to limit its inertia. In fact, each curved elastic member of the first damping means is arranged radially on the outside with respect to each straight elastic member of the second damping means. Thus, the annular phasing member 50 is arranged radially on the inside of the double damping flywheel 10, which limits its radially external mass and its inertia.

Alternatively, each straight elastic member 46 of the second damping means 28 could conversely be arranged radially on the outside with respect to each curved elastic member 34 of the first damping means 26. However, in this case, the annular phasing member 50 would run more radially towards the outside, which would increase its inertia.

It will be noted that the second damping means 28 allow large angular displacements between the third 42 and fourth 44 guide washers and the connecting web 36. Preferably, the second damping means have an angular stiffness of approximately 15 Nm/° for a maximum angular displacement of approximately 40°.

In order to limit this angular displacement, and limit the deformation of the straight elastic members 46, the double damping flywheel 10 comprises a limiting hub 54, attached so as to rotate with the third 42 and fourth 44 guide washers, and comprising external toothing 56 designed to cooperate with clearance 59 with internal toothing 58 of the connecting web 36. Thus, the external 56 and internal 58 toothings form additional stops limiting the angular displacement between the third 42 and fourth 44 guide washers and the connecting web 36.

Preferably, the limiting hub 54 is attached to the third 42 and fourth 44 guide washer with the aid of different attachment means 55A, 55B, which makes it possible to facilitate the mounting of these guide washers 42, 44 on the limiting hub 54.

It will be noted that the difference in the maximum angular displacement between the primary member 12 and the connecting web 36 with the maximum angular displacement between the secondary member 14 and the connecting web 36 is less than 30°, preferably less than 10°.

Furthermore, it will be noted that the characteristic load/angular displacement curve of the first 26 and second 28 damping means can be a mono-slope or multi-slope curve, for example bi-slope. A multi-slope curve is obtained with the aid of elastic members comprising concentric external and internal helical springs, such that the internal springs are shorter than the external springs. Thus, these internal and external springs are compressed in a different way.

The double damping flywheel 10 comprises external sealing means, designed to close a housing surrounding the first 26 and second 28 damping means, in order to keep the viscous lubricant there.

The external sealing means comprise first 62 and second 64 sealing washers, each arranged between the third 42 or fourth 44 guide washer of the second damping means 28 and another element delimiting the housing.

For example, according to the embodiment described, the first sealing washer 62 is arranged between the second guide washer 32 of the first damping means 26 and the fourth guide washer 44 of the second damping means 28. Furthermore, the second sealing washer 64 is arranged between the first guide washer 30 of the first damping means 26 and the third guide washer 42 of the second damping means 28.

Alternatively, the first sealing washer could be arranged between the fourth guide washer 44 of the second damping means 28 and the second annular inertia member 35, and the second sealing washer could be arranged between the third guide washer 42 of the second damping means 28 and the primary flywheel 16, or an element secured onto this primary flywheel 16.

The double damping flywheel also comprises internal sealing means 66 comprising third 68 and fourth 70 sealing washers.

The third sealing washer 68 is arranged between the fourth guide washer 44 and the phasing member 50 of the second damping means 28. This third sealing washer 68 is only subjected to friction along the relative displacement between the fourth guide washer 44 and the phasing member 50, in other words along the half of the maximum angular displacement between the secondary member 14 and the connecting web 36, which is the displacement of the first damping means 26.

The fourth sealing washer 70 is arranged between the third guide washer 42 of the second damping means 28 and the web 36. This fourth sealing washer 70 is subjected to friction along the relative displacement between the third guide washer 42 and the web 36, in other words along the displacement of the second damping means 28.

Preferably, the double damping flywheel 10 comprises means 72 for limiting the torques to which the first and second damping means are subjected.

The torque limiting means 72 comprise a seating washer 74 attached so as to rotate with the limiting hub 54, and a spring washer 76 of the Belleville type inserted between the seating washer 74 and the secondary flywheel 22. The spring washer 76 is designed to apply a load on the secondary flywheel 22, such that this secondary flywheel 22 is pinched between the spring washer 76 and the fourth guide washer 44.

The spring washer 76 is designed to apply a load such that, when the torque is less than a predetermined threshold, the secondary flywheel 22 is connected in rotation with the fourth guide washer 44 and, when the torque is greater than the predetermined threshold, the secondary flywheel 22 slides circumferentially with respect to the fourth guide washer 44.

Preferably, wear-resistant washers 78, 79 are inserted between the spring washer 76 and the secondary flywheel 22, and between the secondary flywheel 22 and the guide washer 44 respectively.

In operation, the torque is transmitted by the crankshaft to the primary member 12 which compresses the curved springs 34 (see FIG. 4). The latter, supported on the lugs 40, pull the web 36 and compress a first level of straight springs 46, then, by means of the annular phasing member 50, compress a second level of straight springs 46. This second level in its turn pulls the secondary member 14, by means of the torque limiting means 72.

The displacement between the secondary member 14 and the web 36 is limited by the stop 54 shown schematically in FIG. 4.

In operation, as indicated above, the centrifugal force causes friction of the spirals of the curved springs 34 on the flange 31 of the guide washer 30, which tends to increase the stiffness of the curved springs 34. In fact, when the speed of the primary member 12 increases, a large proportion of the spirals of the curved springs 34 is blocked by the friction. As the stiffness of a spring is a function of the number of active spirals, the stiffness of the first damping means 26 increases proportionally with the number of blocked or inactive spirals under the effect of the centrifugal force.

In extremis, if all the spirals of the curved springs 34 are blocked, the overall stiffness of the double damping flywheel 10 is that of the second damping means 28, comprising the straight springs 46.

The curved springs 34 have a smaller displacement than in the prior art. They are also lighter, which has the effect of limiting jamming of the spirals due to the action of the centrifugal force. The effectiveness of the curved springs 34 is thereby increased.

The second damping means 28 are less susceptible to the centrifugal force, due primarily to the use of the phasing member 50. The stiffness of the second damping means 28 is thus practically constant in all modes of operation.

The overall stiffness K of the double damping flywheel 10 can be calculated from the stiffness K1 of the first damping means 26 (curved springs 34) and the stiffness K2 of the second damping means (straight springs 46), according to the following formula:

$$1/K = 1/K1 + 1/K2.$$

In dynamic operation, in other words when the centrifugal force is significant, the stiffness K1 increases due to the partial blockage of the curved springs. The stiffness K is then similar to the stiffness K2.

By way of example, the torque transmitted by the crankshaft to the primary member is of the order of 600 N.m.

In a double damping flywheel of the prior art, the first damping means (curved springs) have a displacement of the order of 65°, a stiffness of the order of 9 N.m/° in static operation, in other words when the spirals of the curved springs are not blocked under the effect of the centrifugal force, and a stiffness of the order of 37 N.m/° in dynamic operation, when only 25% of the spirals of the curved springs are still active, the others being blocked under the effect of the centrifugal force.

Moreover, the second damping means have a displacement of the order of 15° and a stiffness of the order of 40 N.m/°, both in static operation and in dynamic operation.

The resulting stiffness K of the double damping flywheel of the prior art is thus 7.5 N.m/° in static operation and 19 N.m/° in dynamic operation.

in a double damping flywheel according to the invention, the first damping means 26 (curved springs 34) have a displacement of the order of 40°, a stiffness of the order of 15 N.m/° in static operation, and a stiffness of the order of 60 N.m/° in dynamic operation, when only 25% of the spirals of the curved springs 34 are still active, the others being blocked under the effect of the centrifugal force.

Moreover, the second damping means 28 (straight springs 46) have a displacement of the order of 40° and a stiffness of the order of 15 N.m/°, both in static operation and in dynamic operation.

The resulting stiffness K of the double damping flywheel of the prior art is thus 7.5 N.m/° in static operation and 12 N.m/° in dynamic operation.

This represents an improvement of over 30% with respect to the prior art. In the extreme case where all the spirals of the curved springs are blocked, the improvement would be even more significant: 15 N.m/° instead of 40 N.m/°.

It will also be noted that, in the case of the prior art, the difference between the maximum angular displacement between the primary member and the connecting web (displacement of the first damping means), and the maximum angular displacement between the secondary member and the connecting web (displacement of the second damping means), is equal to 50° (65°-15°).

In the case of the invention, this difference is zero in the example quoted above (40°-40°). This makes it possible to increase the performance of the second damping means 28 by improving the filtering of noise and vibrations from the engine in all modes of operation.

Lastly it will be noted that the invention is not limited to the embodiment described above.

In fact, as an alternative, the phasing member could be formed by an annular washer surrounding the straight elastic members, comprising radially internal lugs forming the intermediate support elements.

According to another variant, not shown, each straight elastic member 46 could comprise, at least one of its ends, a retainer. Such a retainer would therefore be inserted between the straight elastic member 46 and its seating, preventing direct contact between this straight elastic member 46 and its seating, thereby limiting thereby the wear on the latter.

Likewise, each curved elastic member 34 could also comprise, at least one of its ends, a retainer inserted between this elastic member 34 and its seating, preventing direct contact between this curved elastic member 34 and this seating, thereby limiting thereby the wear on the latter.

According to another alternative embodiment, the double damping flywheel could comprise at least one skid inserted between each curved elastic member 34 and the first guide washer 30, in order to limit the friction generated between this curved elastic member 34 and this first guide washer 30.

According to another alternative embodiment, each straight group of elastic members could comprise more than two straight elastic members. In this case, the double damping flywheel would comprise more phasing members, each phasing member carrying, for each group, an intermediate bearing element inserted between two consecutive elastic members.

For example each group of straight elastic members can comprise three straight elastic members. In this case, the double damping flywheel comprises two phasing members.

Preferably, a double damping flywheel according to this alternative embodiment comprises two curved elastic members.

FIG. 5 illustrates an alternative embodiment of the invention in which curved springs are arranged radially on the inside with respect to straight springs 146.

A connecting web 136 comprises radial lugs 140 forming first seatings 140A, radially internal, for the curved springs 134 and second seatings 140B, radially external, for the straight springs 146.

An annular phasing member 150 is formed by a washer 150 running around straight springs 148 and comprising lugs 152 running radially towards the inside, each lug forming a seating for the straight spring 146.

The invention claimed is:

1. A double damping flywheel (10), comprising a primary (12) flywheel member comprising a primary flywheel (16) and a secondary (14) flywheel member comprising a secondary flywheel (22), the primary (12) and secondary (14) flywheel members being coaxial and rotatable relative to one another and coupled by first (26) and second (28) damping means arranged in series by a connecting web (36), such that:
    the first damping means (26) comprising at least one curved elastic member (34, 134) running circumferentially between two first seatings (40A, 140A) carried by the connecting web (36, 136);
    the second damping means (28) comprising at least two groups (47) of elastic members, each comprising at least two straight elastic members (46, 146) arranged in series by an intermediate bearing element (52, 152), each of the groups (47) of straight elastic members running circumferentially between two second seatings (40B, 140B) carried by the connecting web (36, 136);
    the double damping flywheel (10) further comprising at least one annular phasing member (50, 150) for phasing the straight elastic members (46, 146), separate from the connecting web (36, 136), carrying the intermediate bearing element (52, 152) of each group;
    the difference between the maximum angular displacement between the primary member (12) and the connecting web (36, 136) and the maximum angular displacement between the secondary member (14) and the connecting web (36, 136) being less than 30°.

2. The double damping flywheel according to claim 1, wherein the static angular stiffnesses of the first and second damping means (26, 28) are substantially identical.

3. The double damping flywheel (10) according to claim 1, wherein the maximum angular displacement between the secondary member (14) and the connecting web (36, 136) is greater than the maximum angular displacement between the primary member (12) and the connecting web (36, 136).

4. The double damping flywheel (10) according to claim 1, wherein the second damping means (28) comprise three groups (47) of elastic members (46), each group (47) comprising two straight elastic members (46) each running between a respective second seating (40B) and the intermediate bearing element (52) of this group (47).

5. The double damping flywheel (10) according to claim 1, wherein the phasing member (50) is a washer, generally revolving around an axis (X) of the primary (12) and secondary (14) members, each intermediate bearing element (52) being formed by a radially external lug arranged on the washer (50).

6. The double damping flywheel (10) according to claim 1, wherein each curved elastic member (34) of the first damping means (26) is arranged radially on the outside with respect to each straight elastic member (46) of the second damping means (28).

7. The double damping flywheel (10) according to claim 1, wherein each curved elastic member (34) of the first damping means (26) is arranged radially on the inside with respect to each straight elastic member (46) of the second damping means (28).

8. The double damping flywheel (10) according to claim 1, wherein the phasing member (50) is made of a material with a density of less than 5000 kg/m3.

9. The double damping flywheel (10) according to claim 8, wherein the phasing member (50) is made of a material chosen from the group consisting of aluminium, titanium and a composite with a fibreglass, carbon or kevlar base.

10. A double damping flywheel (10), comprising a primary (12) flywheel member comprising a primary flywheel (16) and a secondary (14) flywheel member comprising a secondary flywheel (22), the primary (12) and secondary (14) flywheel members being coaxial and rotatable relative to one another and coupled by first (26) and second (28) damping means arranged in series by a connecting web (36), such that:
the first damping means (26) comprising at least one curved elastic member (34, 134) running circumferentially between two first seatings (40A, 140A) carried by the connecting web (36, 136);
the second damping means (28) comprising at least two groups (47) of elastic members, each comprising at least two straight elastic members (46, 146) arranged in series by an intermediate bearing element (52, 152), each of the groups (47) of straight elastic members running circumferentially between two second seatings (40B, 140B) carried by the connecting web (36, 136);
the double damping flywheel (10) further comprising at least one annular phasing member (50, 150) for phasing the straight elastic members (46, 146), separate from the connecting web (36, 136), carrying the intermediate bearing element (52, 152) of each group;
the difference between the maximum angular displacement between the primary member (12) and the connecting web (36, 136) and the maximum angular displacement between the secondary member (14) and the connecting web (36, 136) being less than 30°;
the double damping flywheel (10) further comprising internal sealing means (66) comprising third (68) and fourth (70) sealing washers, the third sealing washer (68) being arranged between a fourth guide washer (44) and the phasing member (50) of the second damping means (28), and the fourth sealing washer (70) being arranged between a third guide washer (42) of the second damping means (28) and the web (36).

11. A double damping flywheel (10), comprising a primary (12) flywheel member comprising a primary flywheel (16) and a secondary (14) flywheel member comprising a secondary flywheel (22), the primary (12) and secondary (14) flywheel members being coaxial and rotatable relative to one another and coupled by first (26) and second (28) damping means arranged in series by a connecting web (36), such that:
the first damping means (26) comprising at least one curved elastic member (34, 134) running circumferentially between two first seatings (40A, 140A) carried by the connecting web (36, 136);
the second damping means (28) comprising at least two groups (47) of elastic members, each comprising at least two straight elastic members (46, 146) arranged in series by an intermediate bearing element (52, 152), each of the groups (47) of straight elastic members running circumferentially between two second seatings (40B, 140B) carried by the connecting web (36, 136);
the double damping flywheel (10) further comprising at least one annular phasing member (50, 150) for phasing the straight elastic members (46, 146), separate from the connecting web (36, 136), carrying the intermediate bearing element (52, 152) of each group;
the difference between the maximum angular displacement between the primary member (12) and the connecting web (36, 136) and the maximum angular displacement between the secondary member (14) and the connecting web (36, 136) being less than 30°;
the double damping flywheel (10) further comprising external sealing means comprising first (62) and second (64) sealing washers, the first sealing washer (62) being arranged between a second guide washer (32) of the first damping means (26) and a fourth guide washer (44) of the second damping means (28), and the second sealing washer (64) being arranged between a first guide washer (30) of the first damping means (26) and a third guide washer (42) of the second damping means (28).

12. A double damping flywheel (10), comprising a primary (12) flywheel member comprising a primary flywheel (16) and a secondary (14) flywheel member comprising a secondary flywheel (22), the primary (12) and secondary (14) flywheel members being coaxial and rotatable relative to one another and coupled by first (26) and second (28) damping means arranged in series by a connecting web (36), such that:
the first damping means (26) comprising at least one curved elastic member (34, 134) running circumferentially between two first seatings (40A, 140A) carried by the connecting web (36, 136);
the second damping means (28) comprising at least two groups (47) of elastic members, each comprising at least two straight elastic members (46, 146) arranged in series by an intermediate bearing element (52, 152), each of the groups (47) of straight elastic members running circumferentially between two second seatings (40B, 140B) carried by the connecting web (36, 136);
the double damping flywheel (10) further comprising at least one annular phasing member (50, 150) for phasing the straight elastic members (46, 146), separate from the connecting web (36, 136), carrying the intermediate bearing element (52, 152) of each group;
the difference between the maximum angular displacement between the primary member (12) and the connecting web (36, 136) and the maximum angular displacement between the secondary member (14) and the connecting web (36, 136) being less than 30°;
the connecting web (36) comprising at least one radial lug (40) carrying both:
at least one of the first seatings (40A), designed to cooperate with the curved elastic member (34) of the first damping means (26), and
at least one of the second seatings (40B), designed to cooperate with one of the straight elastic members (46) of the second damping means (28).

13. A double damping flywheel (10), comprising a primary (12) flywheel member comprising a primary flywheel (16) and a secondary (14) flywheel member comprising a secondary flywheel (22), the primary (12) and secondary (14) flywheel members being coaxial and rotatable relative to one another and coupled by first (26) and second (28) damping means arranged in series by a connecting web (36), such that:
the first damping means (26) comprising at least one curved elastic member (34, 134) running circumferentially between two first seatings (40A, 140A) carried by the connecting web (36, 136);

the second damping means (28) comprising at least two groups (47) of elastic members, each comprising at least two straight elastic members (46, 146) arranged in series by an intermediate bearing element (52, 152), each of the groups (47) of straight elastic members running circumferentially between two second seatings (40B, 140B) carried by the connecting web (36, 136);

the double damping flywheel (10) further comprising at least one annular phasing member (50, 150) for phasing the straight elastic members (46, 146), separate from the connecting web (36, 136), carrying the intermediate bearing element (52, 152) of each group;

the difference between the maximum angular displacement between the primary member (12) and the connecting web (36, 136) and the maximum angular displacement between the secondary member (14) and the connecting web (36, 136) being less than 30°;

the second damping means (28) comprising two guide washers (42, 44) each comprising at least one axial indentation (49) forming a housing for the group of the straight elastic members (46).

14. A double damping flywheel (10), comprising primary (12) and secondary (14) flywheel members, the primary (12) and secondary (14) flywheel members being coaxial and rotatable relative to one another and coupled by first (26) and second (28) damping means arranged in series by a connecting web (36), such that:

the first damping means (26) comprising at least one curved elastic member (34, 134) running circumferentially between two first seatings (40A, 140A) carried by the connecting web (36, 136);

the second damping means (28) comprising at least two groups (47) of elastic members, each comprising at least two straight elastic members (46, 146) arranged in series by an intermediate bearing element (52, 152), each of the groups (47) of straight elastic members running circumferentially between two second seatings (40B, 140B) carried by the connecting web (36, 136);

the double damping flywheel (10) further comprising at least one annular phasing member (50, 150) for phasing the straight elastic members (46, 146), separate from the connecting web (36, 136), carrying the intermediate bearing element (52, 152) of each group;

the difference between the maximum angular displacement between the primary member (12) and the connecting web (36, 136) and the maximum angular displacement between the secondary member (14) and the connecting web (36, 136) being less than 30°;

the second damping means (28) comprising two guide washers (42, 44);

the double damping flywheel (10) further comprising a limiting hub (54), attached so as to rotate with the guide washers (42, 44), and comprising external toothing (56) designed to cooperate with clearance with internal toothing (58) of the connecting web (36).

15. The double damping flywheel (10) according to claim 14, further comprising torque limiting means (72) comprising a limiting washer (74) attached so as to rotate with the limiting hub (54), a Belleville spring washer (76) inserted between the limiting washer (74) and the secondary flywheel (22); the Belleville spring washer (76) is provided to apply a load on the secondary flywheel (22) so that the secondary flywheel (22) is pinched between the Belleville spring washer (76) and one of the guide washers (42, 44) of the second damping means (28).

16. The double damping flywheel (10) according to claim 15, wherein the torque limiting means (72) comprise at least one wear-resistant washer (78, 79) inserted between the secondary flywheel (22) and the spring washer (76) and/or between the secondary flywheel (22) and the guide washer (42, 44) of the second damping means (28).

* * * * *